United States Patent
Hirsch

(10) Patent No.: US 6,808,837 B2
(45) Date of Patent: Oct. 26, 2004

(54) ENCLOSED FUEL CELL SYSTEM AND RELATED METHOD

(75) Inventor: Robert S. Hirsch, Troy, NY (US)

(73) Assignee: MTI Microfuel Cells, Inc., Albany, NY (US)

( * ) Notice: Subject to any disclaimer, the term of this patent is extended or adjusted under 35 U.S.C. 154(b) by 316 days.

(21) Appl. No.: 10/092,230

(22) Filed: Mar. 6, 2002

(65) Prior Publication Data

US 2003/0170522 A1 Sep. 11, 2003

(51) Int. Cl.$^7$ ................................................ H01M 8/02
(52) U.S. Cl. .......................... 429/34; 429/30; 429/35; 29/623 R
(58) Field of Search .............................. 429/34, 30, 35; 29/623.2, 623 R

(56) References Cited

U.S. PATENT DOCUMENTS

| | | |
|---|---|---|
| 4,673,624 A | 6/1987 | Hockaday |
| 4,810,597 A | 3/1989 | Kumagai et al. |
| 5,523,177 A | 6/1996 | Kosek et al. |
| 5,573,866 A | 11/1996 | Van Dine et al. |
| 5,599,638 A | 2/1997 | Surampudi et al. |
| 5,631,099 A | 5/1997 | Hockaday |
| 5,723,228 A | 3/1998 | Okamoto |
| 5,759,712 A | 6/1998 | Hockaday |
| 5,766,786 A | 6/1998 | Fleck et al. |
| 5,773,162 A | 6/1998 | Surampudi et al. |
| 5,795,668 A | 8/1998 | Banerjee |
| 5,916,699 A | 6/1999 | Thomas et al. |
| 5,945,231 A | 8/1999 | Narayanan et al. |
| 5,992,008 A | 11/1999 | Kindler |
| 6,326,097 B1 * | 12/2001 | Hockaday .................... 429/34 |
| 2002/0102451 A1 * | 8/2002 | Acker et al. ................. 429/33 |
| 2004/0013927 A1 * | 1/2004 | Lawrence et al. ........... 429/34 |

OTHER PUBLICATIONS

"Fuel Cell", 1992 Fuel Cell Seminar, Program and Abstracts, pp. 233–236, 461–464.
"Miniaturized Fuel Cells for Portable Power", Helen L. Maynard and Jeremy P. Meyers, Lucent Technologies, 2000.
"Pocket–size PEMs", Paul Sharke, Mechanical Engineering.
"Polymer Electrolyte Fuel Cells as Potential Power Sources for Portable Electronic Devices", Shimshon Gottesfeld and Mahlon S. Wilson, pp. 486–517.

* cited by examiner

Primary Examiner—Hoa Van Le
(74) Attorney, Agent, or Firm—Cesari and McKenna LLP

(57) ABSTRACT

An enclosed direct oxidation fuel cell system is provided. The system is sealed with one or more layers of a plastic enclosure that conforms directly to the shape of the fuel cell system. The enclosure is substantially comprised of one or more layers of materials that are non-reactive with the fuel substance used in the fuel cell. In accordance with one aspect of the invention, one of the materials is a plastic film material that provides a good seal to substantially prevent liquids from escaping from the system. Yet, the enclosure is lightweight and conforms substantially to the exterior body of the fuel cell system so that it adds little or no bulk to the fuel cell system. The enclosure also prevents water from leaking out of the system. The enclosure materials may include color-changing properties so that in the event of a leak, it is visually apparent that liquid is in contact with the enclosure.

20 Claims, 3 Drawing Sheets

ENCLOSED FUEL CELL SYSTEM AND RELATED METHOD

BACKGROUND OF THE INVENTION

1. Field of the Invention

This invention relates generally to direct oxidation fuel cell systems, and more particularly, to enclosures for such systems.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most stationary fuel cells are reformer-based fuel cell systems. However, because fuel processing is expensive and requires significant volume, reformer-based systems are presently limited to comparatively high power applications.

Direct oxidation fuel cell systems may be better suited for applications in smaller mobile devices (e.g., mobile phones, handheld and laptop computers), as well as in some larger applications. Typically, in direct oxidation fuel cells, a carbonaceous liquid fuel in an aqueous solution (typically aqueous methanol) is applied to the anode face of a membrane electrode assembly (MEA). The MEA contains a protonically-conductive, but electronically non-conductive membrane (PCM). A catalyst or mixture of catalysts, which enable direct oxidation of the fuel on the anode, is disposed on the surface of the PCM (or is otherwise present in the anode chamber of the fuel cell). Upon the completion of a circuit, protons (from hydrogen in the fuel and water molecules involved in the anodic reaction) are separated from the electrons. Diffusion layers are typically in contact with each of the catalyzed anode and cathode faces of the PCM to facilitate the introduction of reactants and removal of products of the reaction from the PCM, and also serve to conduct electrons. The protons migrate through the PCM, which is impermeable to the electrons. The electrons thus seek a different path to reunite with the protons and oxygen molecules involved in the cathodic reaction and travel through a load, providing electrical power.

One example of a direct oxidation fuel cell system is a direct methanol fuel cell system or DMFC system. In a DMFC system, methanol or an aqueous methanol solution is used as fuel (the "fuel mixture"), and oxygen, preferably from ambient air, is used as the oxidizing agent. There are two half reactions that occur in a DMFC which allow a DMFC system to provide electricity to power consuming devices: the anodic disassociation of the methanol and water fuel mixture into $CO_2$, protons, and electrons; and the cathodic combination of protons, electrons and oxygen into water. The overall reaction may be limited by the failure of either of these reactions to proceed to completion at an acceptable rate (more specifically, failure to oxidize the fuel mixture will limit the cathodic generation of water, and vice versa).

Fuel cells and fuel cell systems have been the subject of intensified recent development because of their ability to efficiently convert the energy in carbonaceous fuels into electric power while emitting comparatively low levels of environmentally harmful substances. The adaptation of fuel cell systems to mobile uses, however, is not straightforward because of the technical difficulties associated with reforming most carbonaceous fuels in a simple, cost effective manner, and within acceptable form factors and volume limits. Further, a safe and efficient storage means for substantially pure hydrogen (which is a gas under the relevant operating conditions) presents a challenge because hydrogen gas must be stored at high pressure and at cryogenic temperatures or in heavy adsorption matrices in order to achieve useful energy densities. It has been found, however, that a compact means for storing hydrogen is in a hydrogen rich compound with relatively weak chemical bonds, such as methanol or an aqueous methanol solution (and to a lesser extent, ethanol, propane, butane and other carbonaceous liquids or aqueous solutions thereof). In particular, DMFCs are being developed for commercial production for use in portable electronic devices. Thus, the DMFC system, including the fuel cell, and the balance of the system components are ideally fabricated using materials that optimize the electricity-generating reactions, and which are also cost effective. Furthermore, the manufacturing process associated with those materials should not be prohibitive in terms of labor intensity cost.

As noted, typical DMFC systems include a fuel source, fluid and effluent management systems, and a direct methanol fuel cell ("fuel cell"), and a means by which any electricity generated can be collected and delivered to a load. The fuel cell typically consists of a housing, and a membrane electrode assembly ("MEA") disposed within the housing. A typical MEA includes a centrally disposed protonically conductive, electronically non-conductive membrane ("PCM"). By way of example, a commercially available PCM is Nafion® a registered trademark of E. I. Dupont de Nemours and Company, a cation exchange membrane based on perflouorocarbon polymers with side chain termini of perflourosulfonic acid groups, in a variety of thicknesses and equivalent weight. While the invention herein is described using one particular architecture of a representative fuel cell system, it is within the scope of the invention that the invention is equally applicable to fuel cell systems other than that described herein. For example, there are other electrolytes available that are well known in the art, including, but not limited to those with liquid (including encapsulated liquid) or "gel" electrolyte-based systems. The present invention is readily adaptable for use with a wide variety of fuel cells, with particular application to microfuel cells used for smaller devices due to its size and space-saving advantages, as discussed herein.

The PCM is typically coated on each face with an electrocatalyst such as platinum, or platinum/ruthenium mixtures or alloy particles. On either face of the catalyst coated PCM, a MEA typically includes a diffusion layer. The diffusion layer functions to evenly distribute the liquid fuel mixture across the anode in the case of the fuel, or the gaseous oxygen from air or other source across the cathode face of the PCM, and provides electron conductivity to allow the system to provide power to the power consuming application. In addition, flow field plates are often placed on the surface of the diffusion layers that are not in contact with the coated PCM. The flow field plates function to provide mass transport of the reactants and byproducts of the electrochemical reactions, and have a current collection functionality in that the flow field plates act to collect and conduct electrons through the load. Those skilled in the art will recognize that it is possible in some circumstances to use a metal screen or other conductive mesh as a current collector, rather than flow field plates, in order to minimize the volume consumed by these components.

As noted, one expected use for the direct oxidation fuel cell is to power small handheld and portable electronic devices. Such devices must conform to strict form factors, and consequently, a power supply unit for such devices must conform to those strict form factors. Thus, the power supply unit must be relatively small, and be capable of powering the device for sufficiently long periods of time without interruption. The fuel cell system is preferably in close mechanical contact with the application to which power is being supplied, to ensure that proper electrical and mechanical contact is established and maintained.

It is desirable to contain any leaks that may occur within the fuel cell system, including but not limited to leaks of fuel or water within the system that may occur within the system in order to minimize the negative effects of such a leak on the portable power application. It is further preferable to have an indication that a leak has occurred, in order to notify the user that a leak has occurred and have the fuel cell system replaced or repaired. Thus, it is preferable to provide a direct oxidation fuel cell system that is well-sealed against leakage of the fuel solution, or water onto the device being powered by the cell or into the environment. It is also preferred that evidence of a potential leak will be provided, while the fuel cell system remains substantially sealed.

Furthermore, it is also desirable to provide protection for the fuel cell itself against airborne environmental contaminants, such as dust and other particulate matter, and further to prevent loss of reactants. However, current packaging for maintaining the integrity of the fuel cell system can be bulky plastics that can be expected to consume approximately 15–30% of the overall size of the DMFC system, presenting challenges in meeting certain form factor requirements. Furthermore, the materials selected for the packaging should not be reactive with the fuel solution or other reactants or byproducts in such a manner that the operation of the fuel cell could be compromised, or effectively halted. It would, however, be desirable if an enclosure for a fuel cell had properties that were leakage-evident in that, upon the occurrence of a leak, a visual indication of this would be provided to the user.

It has been known to provide a reformer-based system, using natural gas as the fuel, having a fuel cell stack that is enclosed in a heat-shrinkable plastic membrane. The plastic membrane encloses the fuel stack in an essentially gas impermeable enclosure. The membrane is gas impermeable so that the natural gas used as the fuel does not escape the fuel cell. The membrane also isolates fuel cells from one another. This type of system is described in U.S. Pat. No. 6,322,920 (Tomson). These systems, however, do not address the needs of fuel cell systems that utilize a liquid fuel.

There are also other known uses of certain plastic membrane enclosures for consumer products, including, but not limited to: medicine containers, food products, consumer products and other items where it is preferable to create a strong seal that is difficult to rupture.

There remains a need, however, for a mechanism and method for enclosing and securing a direct oxidation fuel cell system using a liquid fuel, in a such a manner that the enclosure itself does not add significant volume to the overall assembly, but instead serves to shrink the size of the overall fuel cell system (including packaging) by minimizing the amount of unused space within the packaging of the fuel cell system, while adequately sealing the fuel cell system to maintain the methanol or other liquid fuel inside the cell.

There remains a further need for a mechanism and method for enclosing a liquid fuel cell system to substantially resist leakage of the fuel solution out of the cell system, and to provide safety indications that fuel has leaked, or may leak from the cell system.

It is thus an object of the present invention to provide a fuel cell system that is enclosed and sealed, with a lightweight material that does not add bulk to the system, and does not negatively react with methanol or other substances in the cell. It is a further object of the invention to provide an enclosure with a material that enhances the safety features of the cell, by providing an indication, such as color change, if there is a fuel leakage, or a crack in the seal.

SUMMARY OF THE INVENTION

The disadvantage of prior techniques have been overcome by the present invention in which a direct oxidation fuel cell system is sealed with an enclosure comprising one or more layers of material such as a plastic that conforms directly to the shape of the fuel cell system, and in many instances actually serves to shrink the size of the overall system. The enclosure is substantially comprised of a material that is non-reactive with the fuel substance used in the fuel cell. In accordance with one aspect of the invention, the material is a heat-sensitive, shrink wrap material that provides a good sealant to substantially prevent fuel such as methanol from escaping from the system. Yet, the enclosure is lightweight, substantially impermeable to fluids in the cell, and conforms substantially to the exterior body of the fuel cell system so that it adds little or no bulk to the fuel cell system. The enclosure also prevents water from leaking out of the system.

In accordance with another aspect of the invention, at least one of the materials selected for the enclosure is such that the enclosure acts as an air filter to resist environmental contaminants from entering the fuel cell system. In addition, the material selected is preferably gas permeable, liquid impermeable, so that carbon dioxide, a product of the anode reaction, can be released from the fuel cell system, or a part of the system and oxygen, a cathodic reactant, can be introduced into the cathode aspect of the fuel cell if desired, while still limiting or preventing the escape of any of the fluids within the enclosure and preventing liquids from the ambient environment from entering the fuel cell system.

Safety features may be added to the enclosed system in that the material comprising the enclosure can have properties that allow it to change color when coming in contact with methanol to provide a leakage-evident system. Further, the material, in some circumstances may be one that would cause the overall system to shut down and cease providing power to the device should a leak or water contamination occur.

Mechanical advantages are also provided by the enclosure of the present invention in that the enclosure can aid in aligning the various components of the fuel cell system. In addition, the enclosure material may be used to generate or maintain compression of the DMFC, or fasten the DMFC system to the device, which it is powering, minimizing the number of fasteners needed to establish adequate connection and adherence of the DMFC system to the device.

BRIEF DESCRIPTION OF THE DRAWINGS

The invention description below refers to the accompanying drawings, of which.

DETAILED DESCRIPTION OF AN ILLUSTRATIVE EMBODIMENT

The present invention is an enclosed fuel cell system. The fuel used in the system may be any liquid carbonaceous fuel including, but not limited to, methanol, ethanol, and combinations or aqueous solutions thereof. For purposes of illustration, we herein describe an illustrative embodiment of the invention as it is employed in connection with a direct methanol fuel cell system ("DMFC"), with the fuel substance being methanol or an aqueous methanol solution. It should be understood, however, that it is within the scope of the present invention that the enclosed fuel cell system can be readily used with other fuels. Thus, as used herein, the word "fuel" shall include methanol, ethanol, or combinations or aqueous solutions thereof, and aqueous solutions thereof and other liquid carbonaceous fuels amenable to use in a direct oxidation fuel cell system.

For a better understanding of the invention, a direct methanol fuel cell system with which the invention could be employed will be briefly described. This description is for background only, and those skilled in the art will understand that there are many variations of fuel cells that use different architectures, and components, or components that have multiple functionality. The present invention is not limited to the fuel cell system illustrated in FIG. 1, but instead it has many applications, particularly with fuel cell systems being used in applications that involve strict form factors, due to the volume savings afforded by the present invention, as discussed herein.

Figure 1:
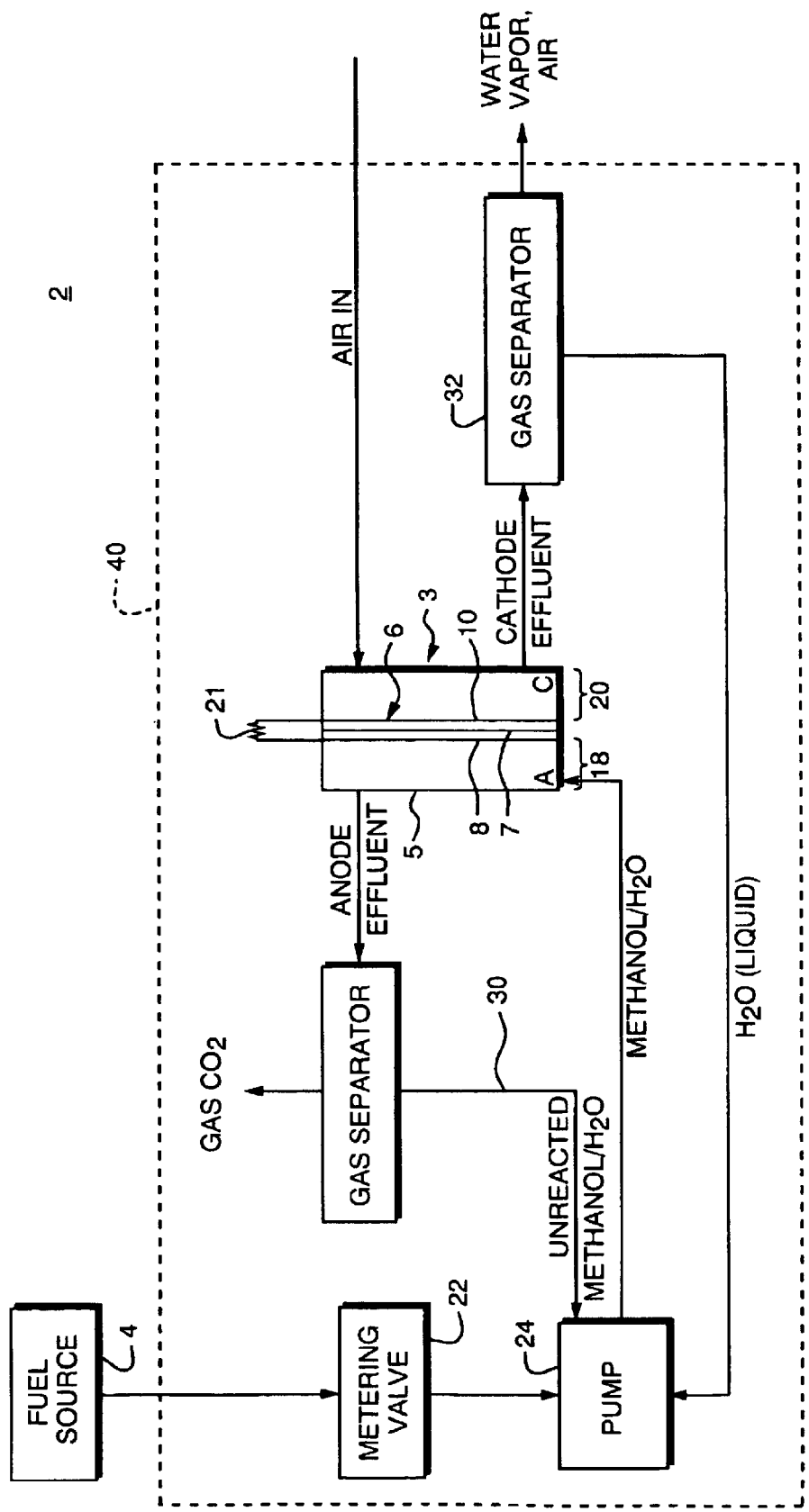
FIG. 1 is a block diagram of a direct methanol fuel cell system that has been enclosed in accordance with the present invention.

Briefly, FIG. 1 illustrates an enclosed direct methanol fuel system 2. The enclosed system 2 includes a DMFC 3. The DMFC 3 has a fuel delivery source 4. The fuel delivery source 4 may be external to the system, and be used to refill the enclosed system, as discussed herein with respect to FIG. 2. Alternatively, the system 2 may be entirely self-contained, and may be shipped with a fuel supply within the enclosed system 2, which case there would not be a separate component from which fuel is delivered.

There may be a number of components within the enclosed system 2. For example, the DMFC 3 includes a housing 5 that encloses a membrane electrode assembly 6 (MEA). MEA 6 incorporates protonically conductive, electronically non-conductive membrane 7 (PCM). PCM 7 has an anode face 8 and cathode face 10, each of which may be coated with a catalyst, including but not limited to platinum or a platinum/ruthenium alloy. The portion of DMFC 3 defined by the housing 5 and the anode face of the PCM is referred to herein as the anode chamber 18. The portion of DMFC 3 defined by the housing 5 and the cathode face of the PCM is referred to herein as the cathode chamber 20. Additional elements of the direct methanol fuel cell system such as flow field plates, and diffusion layers (not shown in FIG. 1) to manage reactants and byproducts may be included within anode chamber 18 and cathode chamber 20.

By way of background, briefly, methanol or a solution of methanol and water are introduced into the anode chamber 18 of the DMFC 3, or into a fuel reservoir or cartridge internal to the enclosed system, from which the fuel solution will be delivered to the anode chamber 18. As will be understood by those skilled in the art, electricity-generating reactions occur when a fuel substance is introduced to the anode face 8 of the PCM, and oxygen, typically in the form of ambient air, is introduced to the cathode face 10 of the PCM in the presence of a catalyst. Components may be includes to actively transport the appropriate concentration of methanol solution to the anode chamber 18, such as the metering valve 24 and an optional pump 24 to assist in the transport of the fuel to the anode chamber 18. Other systems may rely on "passive" delivery of fuel, such as a pressurized cartridge or gravity dependent system, to the anode chamber and each type of system is within the scope of the present inventions.

The fuel mixture passes through channels in associated flow field plates, and/or a diffusion layers (not shown), and is ultimately presented to the PCM. Catalysts on the membrane surface (or which are otherwise present in the anode chamber) oxidize the carbonaceous fuel on the catalyzed anode face 8 of the PCM, separating hydrogen protons and electrons from the fuel and water molecules of the fuel mixture. Upon the closing of a circuit, the protons pass through PCM 7, which is impermeable to the electrons. The electrons thus seek a different path to reunite with the protons, and travel through a load 21 of an external circuit, thus providing electrical power to the load. So long as the reactions continue, a current is maintained through the external circuit. Direct oxidation fuel cells produce water ($H_2O$) and carbon dioxide ($CO_2$) which is separated out by gas separator 30, and the un-reacted methanol and water are recirculated to the pump 24. The cathode effluent is sent to gas separator 32 and water is recirculated to the pump 24, if desired in a particular application. Those skilled in the art will recognize that the enclosed fuel system assembly of the present invention may also include systems with different architectures.

In accordance with the present invention, the DMFC system 2, illustrated in FIG. 1, is covered by an enclosure 40 that encapsulates substantially the entire system. The enclosure 40 is preferably comprised of a material that is non-reactive with methanol or other fuel substance used in the fuel cell, so that it does not impede the electricity producing reactions that occur within the cell 3.

Figure 2A:
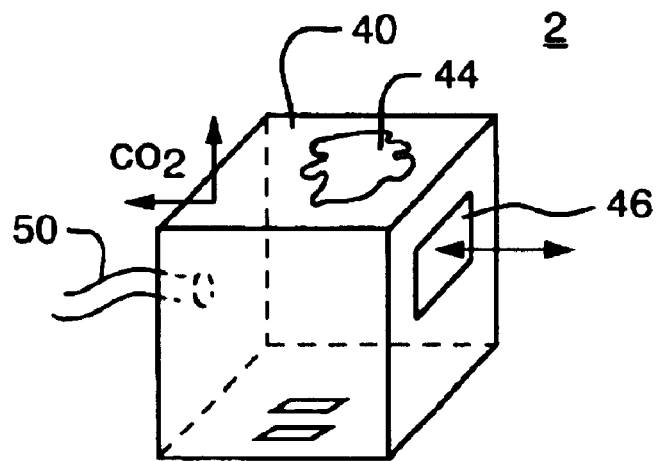
FIG. 2A is an isometric illustration of a fuel cell system enclosed in accordance with the present invention, also illustrating the leak-evident mechanism and a vent in one face of the enclosures in accordance with the invention.

As illustrated in further detail in FIG. 2A, the enclosed fuel cell system 2 has a covering enclosure 40 that generally conforms to the outer surface of the fuel cell system components. In accordance with the method of the present invention, the fuel cell system is covered with an enclosure that is substantially comprised of one or more layers of a material that is a robust plastic film that is shrunk (as by heating in the case of a heat sensitive material), such as a shrink-wrap, or other similar material, so that it tightly fits the fuel cell system components. The resulting enclosure is lightweight and conforms substantially to the exterior body of the fuel cell system so that it adds little or no bulk to the fuel cell system. The material may be selected from the group consisting of Teflon® (tetrafluoroethylene), PVC (polyvinylchloride), and polyolefins, although other materials may also be employed while remaining within the scope of the present invention.

As is shown in FIG. 1, carbon dioxide is produced in the reaction, and needs to be either released from the system, or recirculated within the system. Accordingly, it is preferred, in accordance with some embodiments of the invention depending upon the particular application with which it is to be used that at least a portion of the enclosure material should be gas permeable. It may further be preferable to implement an enclosure that is selectively permeable to carbon dioxide so that carbon dioxide can escape, without permitting oxygen to undesirably enter the anode which would have a negative effect on cell performance. At the same time, at least one material for the enclosure also preferably provides air filtration to protect the fuel cell system against airborne contaminants, such as dust, from undesirably entering the system 2. The material, however, should be liquid impermeable to provide fuel leak resistance, and to prevent fluids from the ambient environment from entering the fuel cell system. While not limiting to the invention, such materials may include a polymer with "shrink wrap" characteristics that is microperforated, expanded, or laser ablated such that such perforations allow gasses to diffuse between the interior of the fuel cell system and the ambient environment, but prevent substantially all solid particulate matter, as well as liquids, from entering the fuel cell system.

Physically, the tightly fitted enclosure provides a space savings advantage when compared to prior plastic packing techniques which could represent up to between 15 to 30% of the overall volume of the system packaged using other packaging techniques known to those skilled in the art. The enclosure of the present invention removes dead air space encountered with heavy plastics used in prior packaging techniques. Moreover, the enclosure technique of the present invention has the further advantage of aligning the fuel cell components and compressing the components of the fuel cell and/or the fuel cell system, so that the overall enclosed system has a smaller volume than it would without having been enclosed. The space savings provided by the enclosure of the present invention can be instead used for additional fuel or additional fuel cell components to provide a higher voltage or greater power output. Said material or materials may also be selected to retain heat within the cell, and as such, may allow the cell to provide a greater power output when run at warmer temperatures. The thermally insulative properties may further prevent any heat generated within the fuel cell system from escaping and raising the temperature outside of the system, thus preventing adverse affects upon the component or application to which electricity is being provided.

As illustrated in FIG. 2A, the material selected for the enclosure 40 can have color-changing properties that cause the material to change color when exposed to methanol, other fuel substance or other liquids. This provides a visual indication 44, that there has been a methanol leak within the fuel cell system that could present a safety concern.

As noted, at least one material selected for the enclosure 40 is preferably gas permeable, but there may still be circumstances in which it is desirable to include a vent 46 that allows oxygen to enter the cathode chamber 20 of the cell, or to vent carbon dioxide out of the anode chamber 18. Thus, there may be instances in which the enclosure 40 includes openings therein, such as the vent 46 illustrated in FIG. 2A, while remaining within the scope of the present invention. The vent 46 may also allow a predetermined portion of the fuel cell 3 or another component in the system to be exposed to the ambient environment to provide an exposed face plate, for example, to provide for increased access to oxygen within the fuel cell system or to allow an aperture for a vent for anodically generated carbon dioxide to be released into the environment. Alternatively, the fuel cell system may be packaged in enclosure, and vents are created to allow sufficient reactants, such as oxygen and fuel, to enter into the system, or that the products of the reaction are allowed to escape from the system, if necessary. In addition, there may be a port 48 that can be engaged using a one way valve or other device through which fuel may be introduced into the anode chamber 18 (or a fuel reservoir in the system) using a tubing 50 from an associated external fuel source when it is necessary or desirable to refill the fuel cell. Alternatively, an opening in the enclosure may provide for the insertion of a fuel cartridge, or disposable fuel source (not shown).

Furthermore, the enclosure 40 may have properties that allow energy generated by the system to be delivered to a power consuming application. More specifically, the plates 54, 56 illustrated in FIG. 2A engage a device, powered by the fuel cell, to deliver the electricity generated by the cell.

Figure 2B:
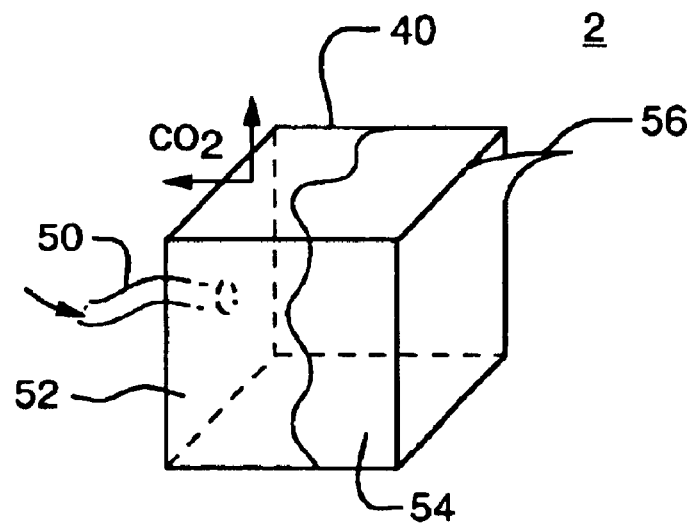
FIG. 2B is the device of FIG. 2A but illustrating that the enclosure may be comprised of several layers.

FIG. 2B is the enclosed fuel cell system of FIG. 2A, with several layers of materials used for the enclosure of the system 2. The enclosure 40 in this embodiment may include a first layer 52 of a first material that wraps the entire system 2. The first material may be gas permeable, for example, to allow carbon dioxide to escape from the anode chamber. A second layer 56, which is shown for purposes of illustration as pealed back, may be a different material than the first layer 52, or it may be the same material. The second layer 56 may be placed over substantially the entire system 2, or a portion of the system 2. The second layer 56 may be applied to only one portion or component of the system, or the cell, to further resist fuel or water leakage, for example. And further, the entire system 2 may be wrapped in two separate layers, and a gaseous or liquid substance may blanket any space, or plenum, between the two layers, to provide further protection and sealing. There are many alternative configurations for layering of enclosure materials that come within the scope of the present invention.

Figure 3:
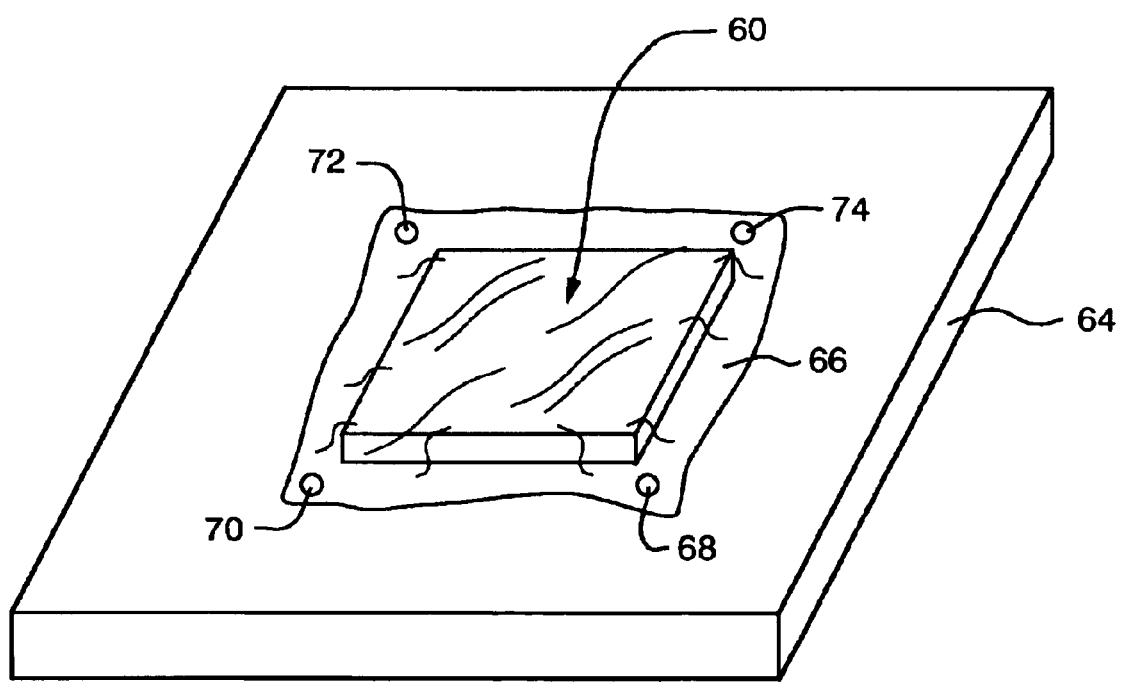
FIG. 3 is an isometric illustration of the direct oxidation power supply unit attached to the electronic device that it powers in accordance with the present invention.

FIG. 3 illustrates another embodiment of the invention in which a fuel cell system 60 is produced or shipped with an electronic device 64 for which it will provide power. In accordance with the invention, the fuel cell system 60 is attached to the device 64 using an enclosure 66, and several suitable fasteners 68 through 74. As the fuel cell system 60 is preferably "shrink-wrapped" to the underlying device, fewer fasteners are needed which allow further cost and space savings.

It should be understood that the enclosed fuel cell system of the present invention has many advantages including sealing and protecting a direct oxidation fuel cell system against leaks of fuel substances out of the system, as well as protecting the system against airborne contaminants from coming into the system. The color-changing properties of the enclosure material serve to provide evidence of leaks. The material can also be used to shut down the fuel cell in certain circumstances. Moreover, the tightly fitted enclosure has several advantages over prior packaging techniques by aligning and compressing the overall system volume and eliminating dead air space from the packaged system.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. An enclosed direct oxidation fuel cell, comprising:
   (A) a direct oxidation fuel cell including a membrane electrode assembly having a protonically-conductive, electronically non-conductive membrane with an anode face and an opposing cathode face; and
   (B) an enclosure, including one or more thin layers of material that are applied to at least a portion of an exterior body of the fuel cell and which layers conform substantially to the shape of at least a portion of said exterior body of the fuel cell, said enclosure being substantially comprised of at least one layer of material that is non-reactive to the liquid fuel delivered to said fuel cell.

2. The enclosed direct oxidation fuel cell as defined in claim 1 wherein at least one layer of said enclosure is comprised substantially of a material that shrinks to conform fit tightly on said fuel cell upon heating.

3. The direct oxidation fuel cell assembly as defined in claim 1 wherein at least one layer of said enclosure material includes color-changing properties that are effective in the presence of liquid to provide a visual indication of a leak.

4. A direct oxidation fuel cell system assembly, comprising:
   (A) a direct oxidation fuel cell system, having:
      (i) a direct oxidation fuel cell including a membrane electrode assembly having a protonically-conductive, electronically non-conductive membrane with an anode face and an opposing cathode face; and
      (ii) a fuel source and delivery apparatus that delivers liquid fuel to the anode face of said fuel cell;
      (iii) an oxygen source coupled with said cathode face; and
      (iv) a gas separator to remove carbon dioxide from the fuel cell; and
   (B) an enclosure including one or more thin layers of material that are applied to at least a portion of an exterior body of the fuel cell system and which layers conform substantially to the shape of at least a portion of said exterior body of the fuel cell system, said enclosure being substantially comprised of at least one layer of material that is non-reactive to the liquid fuel delivered to said fuel cell.

5. The direct oxidation fuel cell system assembly as defined in claim 4 wherein said enclosure includes at least one layer of material having color-changing properties that are effective in the presence of liquid to provide a visual indication of a leak.

6. The direct oxidation fuel cell system assembly as defined in claim 4 wherein at least one layer of said enclosure material is gas permeable, liquid impermeable.

7. The direct oxidation fuel cell system assembly as defined in claim 4 wherein at least one layer of said enclosure material is a plastic film that shrinks to conform to said fuel cell system upon heating said layer.

8. The direct oxidation fuel cell system assembly as defined in claim 6 wherein at least one layer of said enclosure material is gas selective for carbon dioxide to pass therethrough.

9. The direct oxidation fuel cell system assembly as defined in claim 4 wherein said enclosure further comprises multiple layers of material wrapping said fuel cell system.

10. The direct oxidation fuel cell system assembly as defined in claim 4 wherein said enclosure includes a first layer of material wrapping at least one component of said fuel cell system and a second layer of material wrapping substantially the entirety of said fuel cell system.

11. The direct oxidation fuel cell system assembly as defined in claim 4 combination with an electronic device to which the fuel cell is providing power, comprising:
   said direct oxidation fuel cell system being attached to said electronic device by said enclosure material and secured to said device with fasteners.

12. A method of sealing and providing air filtration to a direct oxidation fuel cell system, the method including the steps of:
   (A) identifying at least one component of said fuel cell system that is to be sealed and to receive air filtration;
   (B) selecting as an enclosure, at least one layer of a material that is non-reactive with a fuel substance used by said fuel cell; and
   (C) covering substantially the entirety of said component with at least one layer of said material so that said enclosure conforms to an exterior profile of said component.

13. The method as defined in claim 12 including the further step of selecting said enclosure material from the group consisting of tetrafluoroethylene, polyvinylchloride and polyolefins.

14. The method as defined in claim 12 including selecting as said enclosure at least one layer of a material that is a plastic film that conforms to said fuel cell component upon applying heat thereto.

15. The method as defined in claim 12 including covering the substantially the entire fuel cell system in said enclosure material.

16. The method as defined in claim 12 including the further steps of:
   selecting a first material to be applied as a first layer of said enclosure; and
   selecting a second material to be applied as a second layer of said enclosure.

17. The method as defined in claim 16 including the further steps of:
   selecting one portion of said fuel cell system to be enclosed by said first material; and
   wrapping substantially the entirety of said fuel cell system in the second layer of said enclosure.

18. The method as defined in claim 12 including the further step of
   microperforating said layer of material to allow gases to diffuse between the interior of the fuel cell system and the ambient environment.

19. The method as defined in claim 12 including the further step of
   expanding said layer of material to allow gases to diffuse between the interior of the fuel cell system and the ambient environment.

20. The method as defined in claim 12 including the further step of
   laser ablating said layer of material to allow gases to diffuse between the interior of the fuel cell system and the ambient environment.

* * * * *